United States Patent [19]

Shishkin et al.

[11] Patent Number: 4,699,078
[45] Date of Patent: Oct. 13, 1987

[54] APPARATUS FOR REPAIRING A PIPELINE

[76] Inventors: Viktor V. Shishkin, ulitsa Festivalnaya, 16, kv. 5, Krasnodar; Boris I. Shlatgauer, ulitsa Internatsionalnaya, 129, kv. 27; Vladimir L. Medunitsa, ulitsa Mira, 123, kv. 97, both of Petropavlovsk, Severo-Kazakhstanskoi, oblasti, all of U.S.S.R.

[21] Appl. No.: 878,374

[22] PCT Filed: Sep. 19, 1985

[86] PCT No.: PCT/SU85/00076
§ 371 Date: Jun. 9, 1986
§ 102(e) Date: Jun. 9, 1986

[87] PCT Pub. No.: WO86/02425
PCT Pub. Date: Apr. 24, 1986

[30] Foreign Application Priority Data
Oct. 17, 1984 [SU] U.S.S.R. .............................. 3797661

[51] Int. Cl.$^4$ .............................................. F16L 55/18
[52] U.S. Cl. .................... 118/72; 118/DIG. 10; 118/408; 138/97
[58] Field of Search .................. 15/104.06 R, 104.09, 15/3.5, 3.51, 3.52; 118/72, DIG. 10, 408; 254/134.3 R, 134.3 FT, 134.4; 242/85, 128; 134/22.11, 22.12, 166 C; 138/89, 91, 97, 103

[56] References Cited

U.S. PATENT DOCUMENTS

| 2,108,319 | 2/1938 | Perkins | 118/DIG. 10 |
| 2,794,197 | 6/1957 | Crane | 254/134.4 |
| 3,056,155 | 10/1962 | Harmes | 254/134.4 X |
| 3,107,379 | 10/1963 | Hill | 254/134.4 X |
| 3,547,406 | 12/1970 | Bielstein | 254/134.4 |

FOREIGN PATENT DOCUMENTS

| 1489570 | 10/1977 | United Kingdom . |
| 1507959 | 4/1978 | United Kingdom . |
| 126696 | 2/1960 | U.S.S.R. . |

Primary Examiner—Stephen Marcus
Assistant Examiner—Mark Thronson
Attorney, Agent, or Firm—Lilling & Greenspan

[57] ABSTRACT

A method for repairing a pipeline includes the steps of cleaning the pipeline (1) from deposits concurrently with laying therein a flexible line (4) which is used for drawing into the pipeline (1) a traction cable (5) and energy and mortar supply lines (6 and 7) connected to a coating application device (10). In an apparatus for carrying out the method, a flexible line supply device (8) is mounted on a cleaning device (3), behind the cutting tool (9) thereof, and includes a chamber (12) which is open at the end thereof, and houses a horizontally mounted reel with flexible line (4) and a rotatable member (14) for unwinding the flexible line (4) from the reel (13).

1 Claim, 2 Drawing Figures

APPARATUS FOR REPAIRING A PIPELINE

BACKGROUND OF THE INVENTION

1. Field of the Invention

The invention relates to the operation of pipelines, and more specifically, it deals with a method and apparatus for repairing a pipeline.

2. Description of the Prior Art

Known in the art are methods and apparatuses for repairing pipelines (cf. A Drawing Technique for Restoring Pipelines. Operating Instructions. Ameron Co., USA, 1978).

In accordance with the prior art method, openings are cut-out in the pipeline at 230 m spacing. Then a flexible line is laid along the pipeline, and a traction cable is drawn into the pipeline by means of this flexible line. A cleaning means is moved through the pipeline by the traction cable. After the cleaning, a device for laying the traction cable is again moved through the pipeline so as to move, through the pipeline, a coating application means and hoses for supplying compressed air and mortar to the coating application means (i.e. energy amd mortar supply lines). The means for laying a flexible line along the pipeline comprises a prime mover having an electric motor moving through the pipeline and a drum with a stock of flexible line installed outside the pipeline.

However this sequence of steps requires a long time for repair of a pipeline and calls for use of special mechanisms for each step thus resulting in an increased repair cost, prolonged cleaning time and high labour effort for operating various mechanisms.

SUMMARY OF THE INVENTION

It is an object of the invention to provide a method and apparatus for repairing a pipeline wherein, owing to the combining of auxiliary steps of laying various lines, a part of the equipment might be dispensed with, with simplification of the process and facilitation of operation.

This object is accomplished by a method for repairing a pipeline, comprising the steps of cleaning a pipeline from deposits, laying a flexible line, and drawing into a pipeline a traction cable and energy and mortar supply lines connected to a coating application means. According to the invention, the flexible line is laid concurrently with cleaning of the pipeline from deposits.

The apparatus for carrying out the method for repairing a pipeline according to the invention, comprises a cleaning means, a means for supplying a flexible line, and a means for applying a coating to the inner surface of the pipeline connected to a traction cable and to energy and mortar supply lines. According to the invention, the means for supplying a flexible line is installed on the cleaning means, behind its cutting tool, and comprises a chamber which is open at the end thereof and houses a horizontally mounted reel with a flexible line and with a rotatable member for paying-off the flexible line from the reel.

Laying the flexible line during cleaning of the pipeline makes it possible to simplify repair of pipeline and cutdown the repair time, while at the same time reducing the number of pieces of equipment and dispensing with an independent prime mover for laying the flexible line. Reliability of flexible line laying is improved because the whole stock of flexible line moves together with the cleaning means through the pipeline.

BRIEF DESCRIPTION OF THE DRAWINGS

The invention will now be described in detail in the following disclosure of an embodiment of a method and apparatus for repairing a pipeline with reference to the accompanying drawings in which.

DESCRIPTION OF A PREFERRED EMBODIMENT

Figure 1:
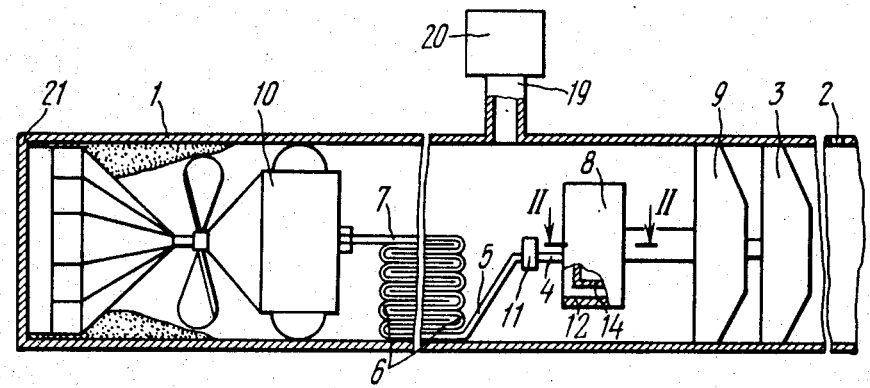
FIG. 1 is a schematic view of an apparatus installed in a pipeline.

A method of repair comprises the steps of cutting-out, in a pipeline 1 (FIG. 1), openings 2 at a certain spacing. Then a known per se cleaning means 3 is installed in the pipeline 1 through one of the openings 2, the cleaning means being caused to move through the pipeline under the action of a fluid flow. A stock of flexible line 4 is hanged on the cleaning means 3, the end of the flexible line being secured, by means of a swivel joint, to a traction cable or to the pipeline adjacent to the opening 2. When the cleaning means 3 moves through the pipeline, cleaning of the pipeline from deposits and laying of the flexible line 4 take place concurrently.

Then the end of the flexible line 4 is released, and a traction cable 5, energy and mortar supply lines 6 and 7 (i.e. hoses for compressed air and cement and sand mortar supply) are connected to the flexible line in a known manner.

As the flexible line 4 is pulled out, the traction cable 5 and supply lines 6 and 7 having their opposite ends connected to a coating application means are drawn into the pipeline.

An apparatus for carrying out the method according to the invention comprises a cleaning means 3 of any appropriate known type, which is caused to move through the pipeline under the action of a fluid flow; a means 8 for supplying the flexible line 4 installed on the cleaning means, behind its cutting tool 9; a known means 10 for applying a coating to the inner surface of the pipeline, e.g. a coating of cement and sand mortar.

The means 10 is connected to the traction cable 5, energy and mortar supply lines 6 and 7, e.g. by means of flexible hoses which are connected, by means of a swivel joint 11, to the end of the flexible line 4 laid in the pipeline.

Figure 2:
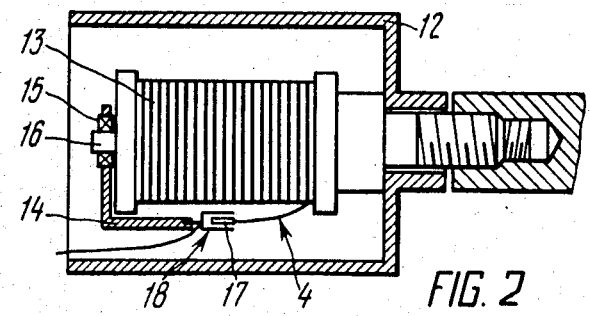
FIG. 2 is a sectional view taken along line II—II in FIG. 1.

The means 8 for supplying the flexible line 4 comprises a chamber 12 (FIG. 2) open at one end thereof. A reel 13 with a stock of flexible line 4 is horizontally mounted in the chamber 12. A rotatable member 14 for paying-off the flexible line from the reel is mounted on the reel 13.

The rotatable member 14 comprises an L-shaped arm having one end thereof mounted on the shell of a bearing 15 installed on a shaft 16 of the reel 13. The other end of the arm, which extends in parallel with the axis of the reel, carries a roller 4 embraced by a rotatable yoke 18. The flexible line 17 runs through an opening defined between the yoke 18 and roller 17. The length of the end of the arm carrying the roller 17 is equal to one-half of the width of the reel 13.

For moving the cleaning means 3 by the flow of fluid, the pipeline communicates with a pipe 19 (FIG. 1) connected to a fluid supply system 20. The sections of the pipeline under repair are sealed off from the remaining part of the pipeline by means of plugs 21.

The apparatus according to the invention functions in the following manner.

Fluid, e.g. water, is pumped into the pipeline 1 by the supply system 20, and the fluid causes the cleaning means 3 to move through the pipeline so as to clean it from deposits.

During movement of the cleaning means 3 through the pipeline, the rotatable member 14 (FIG. 2) rotates about the reel 13 to unwind the flexible line 4 which rotates about the traction cable 5 by means of the swivel joint 11 (FIG. 1).

When the cleaning means has reached the end of the section of the pipeline 1 being repaired, the flexible line 4 is disconnected from the cleaning means 3 and secured to a traction means (not shown in the drawings). Then the traction cable and energy and mortar supply lines are drawn into the pipeline through the opening 2 by means of the flexible line 4 and are connected to the means 10 for coating application, and mortar is applied to the inner surface of the pipeline in a known manner with concurrent movement of the means 10 through the pipeline. The traction cable 5, energy and mortar supply lines 6 and 7 are then withdrawn from the pipeline 1 through the next opening 2.

When the means 10 approaches the next opening 2, the traction cable, energy and mortar supply lines 6 and 7 are disconnected therefrom, and other traction cable and energy and mortar supply lines are connected thereto, which have been laid in the next section of the pipeline.

The invention may be used for applying a cement and sand mix to the inner surface pof municipal, industrial, agricultural, meliorative and other pipelines during construction or overhaul.

We claim:

1. An apparatus for repairing a pipeline, comprising cleaning means (3) having a cutting tool; a flexible line (4) supply means (8), and means (10) for applying a coating to the inner surface of the pipeline (1); a traction cable (5) and energy and mortar supply lines (6 and 7) connected to said coating application means, characterized in that said flexible line supply means (8) is installed on said cleaning means (3), behind said cutting tool (9) thereof, and having a chamber (12) provided with an open end at one end thereof, a reel (13) with flexible line (4) horizontally mounted in said chamber and a rotatable member (14) mounted on said reel (13) for paying-off said flexible line (4) from said reel (13).

* * * * *